United States Patent [19]
Hinderling

[11] Patent Number: 6,123,427
[45] Date of Patent: *Sep. 26, 2000

[54] ARRANGEMENT FOR RETROREFLECTION OF A RAY USING TRIPLE PRISMS

[75] Inventor: Juerg Hinderling, Marbach, Switzerland

[73] Assignee: Leica Geosystems AG, Heerbrugg, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 09/011,885

[22] PCT Filed: Aug. 13, 1996

[86] PCT No.: PCT/EP96/03577

§ 371 Date: Feb. 19, 1998

§ 102(e) Date: Feb. 19, 1998

[87] PCT Pub. No.: WO97/08572

PCT Pub. Date: Mar. 6, 1997

[30] Foreign Application Priority Data

Aug. 22, 1995 [DE] Germany .............................. 195 30 809

[51] Int. Cl.⁷ .................................................. G02B 5/122
[52] U.S. Cl. ........................................... 359/529; 359/834
[58] Field of Search ..................... 359/529, 530, 359/531–533, 546–553, 831, 833, 834, 836

[56] References Cited

U.S. PATENT DOCUMENTS

| | | |
|---|---|---|
| 3,039,093 | 6/1962 | Rockwood . |
| 4,416,509 | 11/1983 | Milan ...................................... 359/529 |
| 4,715,714 | 12/1987 | Gaechter et al. ....................... 356/375 |
| 5,301,435 | 4/1994 | Buckley ................................... 33/293 |

FOREIGN PATENT DOCUMENTS

34 24 806  8/1985  Germany .

OTHER PUBLICATIONS

"Theodolite—Sensoren Fuer Die Industrielle Vermessung", Opticus, No. 1/94, pp. 8–9, (1994) (No Month).

Primary Examiner—James Phan
Attorney, Agent, or Firm—Foley & Lardner

[57] ABSTRACT

The invention relates to an arrangement for retroreflection of an optical ray using triple prisms. Six to ten triple prisms (1, 2, 3, 131, 132, 133) arm provided with triangular light entry surfaces, wherein the side faces of adjacent triple prisms are in contact. This results in continuous retroreflection at a high level of intensity for one angle area, of 360°. When used in particular in geodesy or in construction surveying, this all-round reflector provides a high degree of measurement accuracy for angles and distances from any direction on which a bearing is taken. Alignment towards a surveying instrument is therefore not necessary. Measurement of short distances is also definite and reliable. The all-round reflector is particularly advantageous for automatic surveying, since, irrespective of its orientation, it can be automatically tracked by a motorised surveying instrument.

21 Claims, 5 Drawing Sheets

ARRANGEMENT FOR RETROREFLECTION OF A RAY USING TRIPLE PRISMS

CROSS-REFERENCE TO RELATED APPLICATION

This application is the national stage application of PCT/EP96/03577, filed Aug. 13, 1996, which is entitled to priority of German Application No. 195 30 809.3, filed Aug. 22, 1995.

BACKGROUND OF THE INVENTION

1. Field of the Invention

The invention relates to an arrangement for retroreflection of an optical ray using triple prisms.

2. Description of the Related Art

In geodetic surveying, in construction surveying and in industrial measurement technology use is made of self-radiating or reflecting aiming markers such as spherical reflectors, reflecting foils or triple prisms, in order to mark points in space. The aiming markers are sighted with theodolites or with a tachymeter, that is to say a theodolite with a range finder. By measuring direction and distance to the aiming markers, their three-dimensional co-ordinates are determined with regard to a prescribed co-ordinate system.

In addition to determining and recording co-ordinates, it is also possible conversely for co-ordinates, which are recorded in a plan or can be taken from a map, to be laid out on the spot. For example, in roadbuilding the line is laid out by means of theodolite or a tachymeter and a plumb rod provided with an aiming marker. In this case, at least two people are required as operators who communicate by hand sign or radio. On the one hand, the co-ordinates prescribed according to the plan are set on the surveying instrument while, on the other hand, the plumb rod with the aiming marker is moved until the aiming marker has reached the required co-ordinates. In this case, the operators always have to pay heed to the alignment of the aiming marker relative to the surveying instrument.

In the case of surveying operations in which the instrument setups change, the same bench marks are frequently used for surveying. The aiming markers set up for the bench marks are sighted in this case from different directions. The aiming markers must, in turn, be aligned with the respective surveying instrument by rotation.

Furthermore, in the case of specific surveying operations in building or surveying, an aiming marker can serve simultaneously as a reference aiming marker for a plurality of surveying instruments. In this case, as well, the aiming marker must successively be aligned with each individual surveying instrument.

A further difficulty arises for the carrier of the plumb rod with the arrival of automated surveying instruments. With modern surveying instruments, the visual observation of the aiming marker via the theodolite telescope is additionally supported or even replaced by an electronic recording of the aiming marker. The recordings are performed by video cameras or with the aid of CCD-Arrays which are integrated in the imaging optical system of the theodolite. Such systems are described in the journal "OPTICUS", No.1/94, Pages 8 to 9, of the company LEICA AG, "Theodolite—Sensoren für die industrielle Vermessung" ("Theodolites—Sensors for industrial surveying") or in DE 3424806 C2. It is possible with the aid of image processing automatically to detect the aiming markers and determine their co-ordinates. As a result, a motorized theodolite can be controlled in such a way that it can automatically track a moving aiming marker. This means that the carrier of the plumb rod can certainly move freely in the field without the theodolite losing the aiming marker from the field of view. However, the aiming marker must simultaneously always be aligned with the theodolite, and this deflects the attention of the carrier of the plumb rod from the field and the measuring points. Consequently, for this application of the automated tracking of aiming markers the need also arises to have an aiming marker with a relatively large, retroreflecting angular range.

The spherical reflectors, chromium-plated steel balls, frequently used in industrial measurement technology would be ideal. They can be illuminated from all directions and deliver the same aiming marker image in each case. However, only very short ranges can be measured with them, since the intensity reflected by them decreases with the fourth power of the distance. Consequently, in geodetic surveying or in construction surveying use is mostly made of reflecting foils or triple prisms, which have a high reflection factor. However, with them the retroreflected intensity is a function of angle, and the useful angular range is limited to approximately ±45°.

U.S. Pat. No. 5,301,435 has disclosed a prism arrangement in which a plurality of retroreflecting prisms, which have a customary round light entry surface, are arranged on a cylindrical surface. The individual prisms are spatially separated. Three prisms each are situated in two planes lying one upon another. The prisms of one plane are offset by 120° relative to one another and by 60° with respect to those of the neighboring plane. Consequently, each prism covers an angular range, and the entire prism arrangement reflects light from all horizontal directions over 360°. Distances are measured with this prism arrangement. However, in this case only distances above a specific minimum distance of approximately 1000 m can be measured.

SUMMARY OF THE INVENTION

It is the object of the invention to specify a retroreflector for an optical ray by means of which retroreflection is possible at a high intensity for a large angular range, which can be up to 360° all around for all directions, and by means of which it is possible reliably to achieve measurement both of angles and of distances with a high geodetic measuring accuracy—even in the case of very short distances.

The object is achieved by virtue of the fact that 6 to 10 triple prisms are provided and arranged in such a way that the side faces of respectively adjacent triple prisms bear directly against one another and the triple prism vertices are situated as close to one another as possible in space, the light entry surface of each triple prism being constructed in a triangular shape, and the light entry surfaces of adjacent triple prisms being tilted relative to one another, and the lines of contact of the pupils of neighboring triple prisms extend in a skew fashion relative to a vertical axis leading through the center of the arrangement.

Advantageous embodiments and developments of the invention follow from the subclaims 2 to 5.

The retroreflecting effect of a triple prism derives from that of a triple mirror, in which three mirror faces abut one another at a right angle in each case. If light falls into such a triple mirror, the light rays are reflected at all three mirror faces, the light rays emerging from the triple mirror extending in parallel and laterally offset relative to the incident light rays. This retroreflection is possible within a specific range of incidence angle. A triple prism, which is also designated as a triple mirror prism, can be produced, for example, from a glass cube by cutting out a cube corner. The surface of section forms the entry surface of the light. The three mutually perpendicular side walls of the cube corner are generally silvered. It is also possible, if appropriate, to utilize total reflection in the case of side walls which are not silvered. The overall result is retroreflection of the incident light in which, therefore, incident and emerging light have the same direction except for the sign.

The cube corner itself is designated as the prism vertex of the triple prism. The space diagonal through the prism vertex is generally skew relative to the surface of section of the prism. If the space diagonal and surface of section are perpendicular to one another, the result is a rotationally symmetrical triple prism. It is true that the light entry surface forms a triangle geometrically as surface of section of a cube corner, but for optical reasons and reasons of production engineering, the corners of the light entry surface are very strongly rounded off. In the majority of cases, a completely round light entry surface is produced.

Not all the light which falls through the light entry surface is also retroreflected. Only the light falling into the pupil of the triple prism can be retroreflected. The pupil is defined by the lateral edges of the light entry surface and by those (straight and curved) lines which are produced by point reflection of the lateral edges of the light entry surface at the virtual prism vertex. The virtual prism vertex is the prism vertex which is visible on looking into the triple prism but, because of the refraction of the prism glass, is only apparent.

The largest pupil surface, and thus the largest amount of light retroreflected results, for example, for a rotationally symmetrical triple prism in the case of the incidence of light perpendicular to the light entry surface of the triple prism.

In the case of changed angles of incidence of the light into the triple prism, the shape and size of the pupil change. With increasing incidence angle, the pupil surface becomes smaller and is situated more at the edges of the light entry surface. Finally, in the case of a specific incidence angle the areas vanish, and no more light is retroreflected.

According to the invention, a plurality of triple prisms with triangular light entry surfaces are arranged in such a way that the side faces of neighboring triple prisms touch one another. In this case, the triple prisms can be of different size and have different angles of their light entry surfaces relative to the space diagonal through the triple prism vertex. This is useful for specific, prescribed angular ranges in the case of retroreflections.

The action of such triple prisms in their arrangement according to the invention is based on the fact that upon transition of the retroreflection from one triple prism to the neighboring triple prism the pupils thereof touch along a relatively long path. Whereas with changing incidence angle the pupil area of one triple prism decreases, the pupil area of the neighboring triple prism increases, the sum of the pupil areas always remaining large. Consequently, a large quantity of light is retroreflected continuously with the angle of incidence of the light into the triple prism arrangement.

In addition, because of the touching of the pupil surfaces of neighboring triple prisms along a relatively large range, the reflected light bundles are situated close to one another in space. This is important for a high measuring accuracy in the case of the three-dimensional determination of co-ordinates with the triple prism arrangement, and for automated measurement. However, this also means that only a small number of triple prisms should be used.

In particular, eight triple prisms can be arranged to form an octahedron, with the result that neighboring prism side faces touch one another in each case and the prism vertices meet one another at the center of the octahedron. Complete all-round retroreflection is thus achieved. The light is retroreflected at high intensity for any desired horizontal and vertical incidence angle.

With such a prism arrangement, retroreflecting over all directions in space, as aiming marker, there is no longer any need to align with a surveying instrument. This aiming marker can thus be moved arbitrarily in the field without the person who carries it having to pay heed to its alignment. This is a decisive advantage in the case of automatic surveying.

For fastening reasons, two opposite octahedron places of the prism arrangement can remain unoccupied by triple prisms. The prism arrangement can be fastened at these sites to a plumb rod or stand, for example. The all-round reflection is maintained in this case for horizontal directions, while the angular range valid for the existing triple prisms can be used for the vertical directions. If appropriate, a plurality of prism arrangements of this type can also be fastened at specific spacings to a plumb rod.

The determination of a co-ordinate of the prism arrangement according to the invention is performed from the centroid of the optical reflections coming from it. Depending on the incidence angle, up to three triple prisms can simultaneously reflect the light at different intensities, in each case. It has emerged that the location of the centroid of the optical reflections varies with the incidence angle of the light only within very narrow limits. The measuring accuracy of the three-dimensional co-ordinates of the prism arrangement is always better than 5 mm for each co-ordinate. This holds for every incidence angle and for the distance range from 0 m to more than 1,000 m. Most measurement requirements are thereby met. If a particularly high measuring accuracy is required, one of the triple prisms of the arrangement can be aligned in a conventional way exactly with the surveying instrument, and a high point accuracy of approximately 1 mm can thus be achieved.

In range finding, it is customary to use range finders in which the ray bundles of optotransmitter and optoreceiver are situated next to one another in a spatially separated fashion. Multiple reflections which falsify the measurement result occur between the range finder and conventional reflectors. Because of the fact that the pupils of the prism arrangement are situated obliquely relative to the arrangement of optotransmitter and optoreceiver of the range finder, and of the low number of prisms, the effect of multiple reflections is largely reduced.

In the case of conventional aiming marker arrangements (U.S. Pat. No. 5,301,435), reflections additionally occur at the spatially separated triple prisms, and this likewise leads to a faulty distance measurement. This is in evidence chiefly in the range of short distances, for which reason it is necessary to keep a minimum distance in the case of such aiming marker arrangements. By contrast therewith, reliable measurement of range is possible even over short distances by means of the prism arrangement according to the invention, which has reflections situated very closely next to one another.

BRIEF DESCRIPTION OF THE DRAWINGS

Exemplary embodiments are explained in more detail below with the aid of the drawing, in which.

DESCRIPTION OF SPECIFIC EMBODIMENTS

Figure 1A:
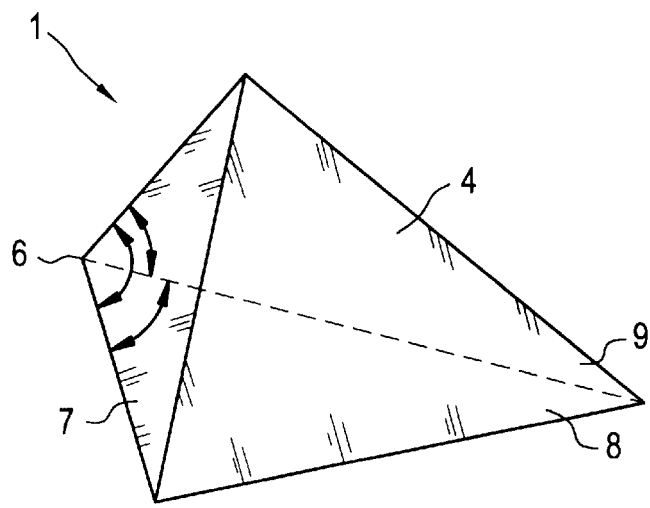
FIG. 1a shows a diagrammatic representation of a triple prism.

FIG. 1a shows a triple prism 1 made from glass. Silvered side faces 7,8,9 meet at a right angle at the triple prism vertex 6. The light entry surface 4 is constructed in a triangular shape.

In general, triple prisms 1 of different size and having triangular light entry surfaces 4 with triangular edges of different length can be produced and used for the arrangement according to the invention. In this case, the light entry surfaces 4 are tilted relative to one another. For the purpose of an easier representation of the invention, the following figures show rotationally symmetrical triple prisms 1 of identical size, in the case of which the light entry surface 4 forms an equilateral triangle.

Figure 1B:
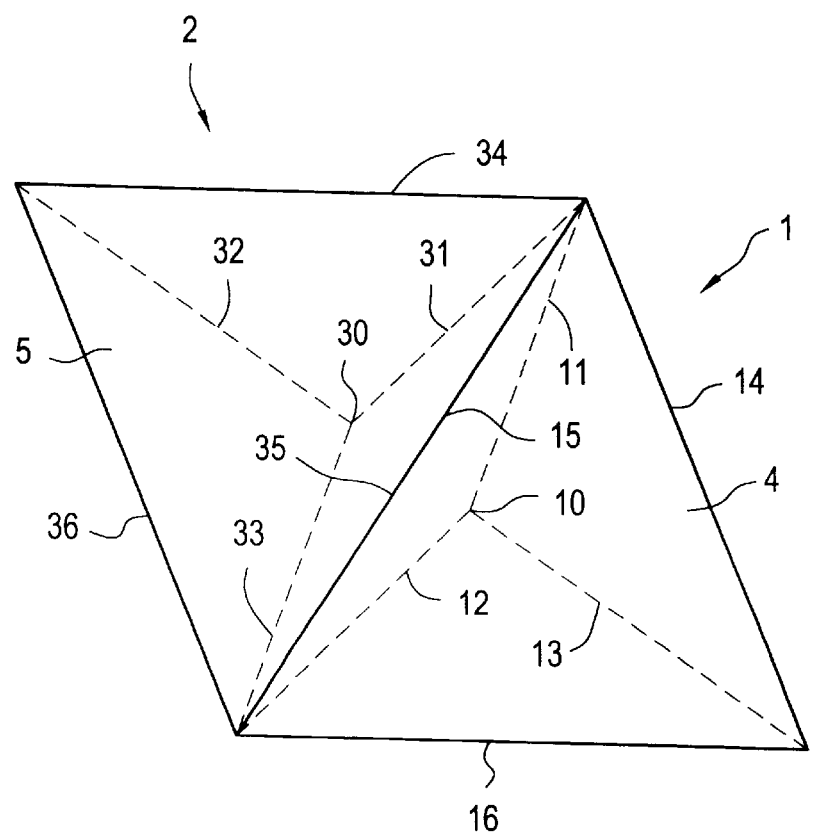
FIG. 1b shows a diagrammatic representation of the light entry surfaces and virtual prism vertices of two neighboring triple prisms.

Two such triple prisms 1 and 2 are represented diagrammatically in FIG. 1b. The light entry surface 4 of the triple prism 1 is bounded by the triangle sides 14,15,16, and the light entry surface 5 of the triple prism 2 is bounded by the triangle sides 34,35,36. In the representation of FIG. 1b, the light entry surfaces 4 and 5 are not located in the plane of the drawing, but, proceeding from the triangle sides 15 or 35 lying in the plane of the drawing, extend backwards in space. The triangle vertices, which are formed by the sides 14 and 16 or 34 and 36, are thus situated in the background.

In addition, the neighboring side faces of the triple prisms 1 and 2 are to be directly contiguous, and the edges 15 and 35 formed by the light entry surfaces 4 and 5 are to coincide. In this case, the neighboring side faces behind the edges 15 and 35 are perpendicular to the plane of the drawing and cannot actually be seen when looking into the triple prisms 1 and 2. Because of the refractive index of the triple prisms 1 and 2, which generally consist of glass, they are, however, visible and define the triangles with the sides 11,12,15 and 31,33,35. The virtual prism vertices 10 and 30 of the triple prisms 1 and 2 are likewise visible, although their real prism vertices coincide. The existence of the virtual prism vertices 10 and 30 is decisive for the invention, since the pupil surfaces, explained with reference to FIG. 2, of the triple prisms 1 and 2 differ from zero thereby, and can therefore retroreflect light incident perpendicular to the plane of the paper. With two triple mirrors, in which no refractive action is present, retroreflection would therefore be impossible in the same arrangement and with the same conditions for the incidence of light.

The other side faces are respectively perpendicular to the neighboring side faces of the triple prisms 1 and 2. Said other faces are represented by the faces having the boundaries 12,13,16 and 11, 13, 14 or 31,32,34 and 32,33,36.

Figure 2:
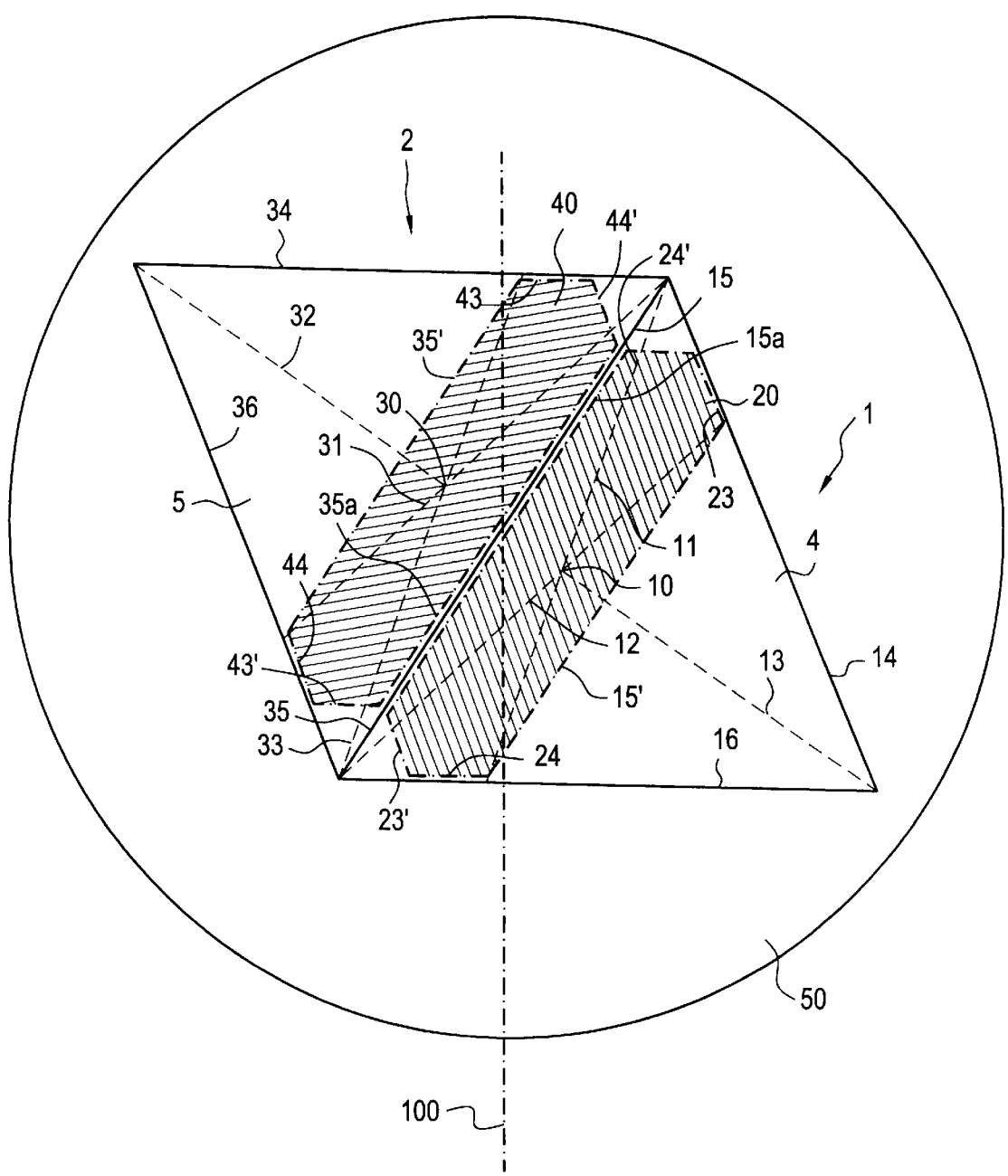
FIG. 2 shows a diagrammatic representation of the pupils of the triple prism arrangement in accordance with FIG. 1b in the case of full illumination in order to determine the angular co-ordinates.

The arrangement of the triple prisms in accordance with FIG. 1b is illuminated perpendicular to the plane of the drawing with light in the optical wavelength range. This is represented in FIG. 2 by the circular illumination surface 50. The circular illumination surface 50 covers the light entry surfaces 4 and 5 of the triple prisms 1 and 2. However, it is only the light incident in the pupil surfaces 20 and 40, represented hatched, of the triple prisms 1 and 2 which is also retroreflected. In this case the pupil surface 20 is defined by a segment 15a of the prism edge 15 and by the segments 23 and 24 of the prism edges 14 and 16 and by the boundary lines 15',23' and 24'. The boundary lines 15',23' and 24' are produced by point reflection of the corresponding parts of the prism edges 15,14,16 at the virtual prism vertex 10. By analogy therewith, the pupil surface 40 of the triple prism 2 is defined by edge parts 35a,43,44 and their lines 35',43',44' which are point-reflected at the virtual prism vertex 30. The retroreflected light is likewise point-reflected at the virtual prism vertices 10 or 30 with respect to the incident light.

A vertical axis 100 leads through the real prism vertices (not illustrated here) of the triple prisms 1 and 2. The line of contact 15a,35a of the pupils 20,40 extends in a skew fashion relative to the axis 100. The optical reflections are picked up by a surveying instrument and from this, for example by determining the centroid, the angular co-ordinates, that is to say the horizontal and vertical angles, of the surveying instrument are determined relative to the prism arrangement according to the invention.

Figure 3:
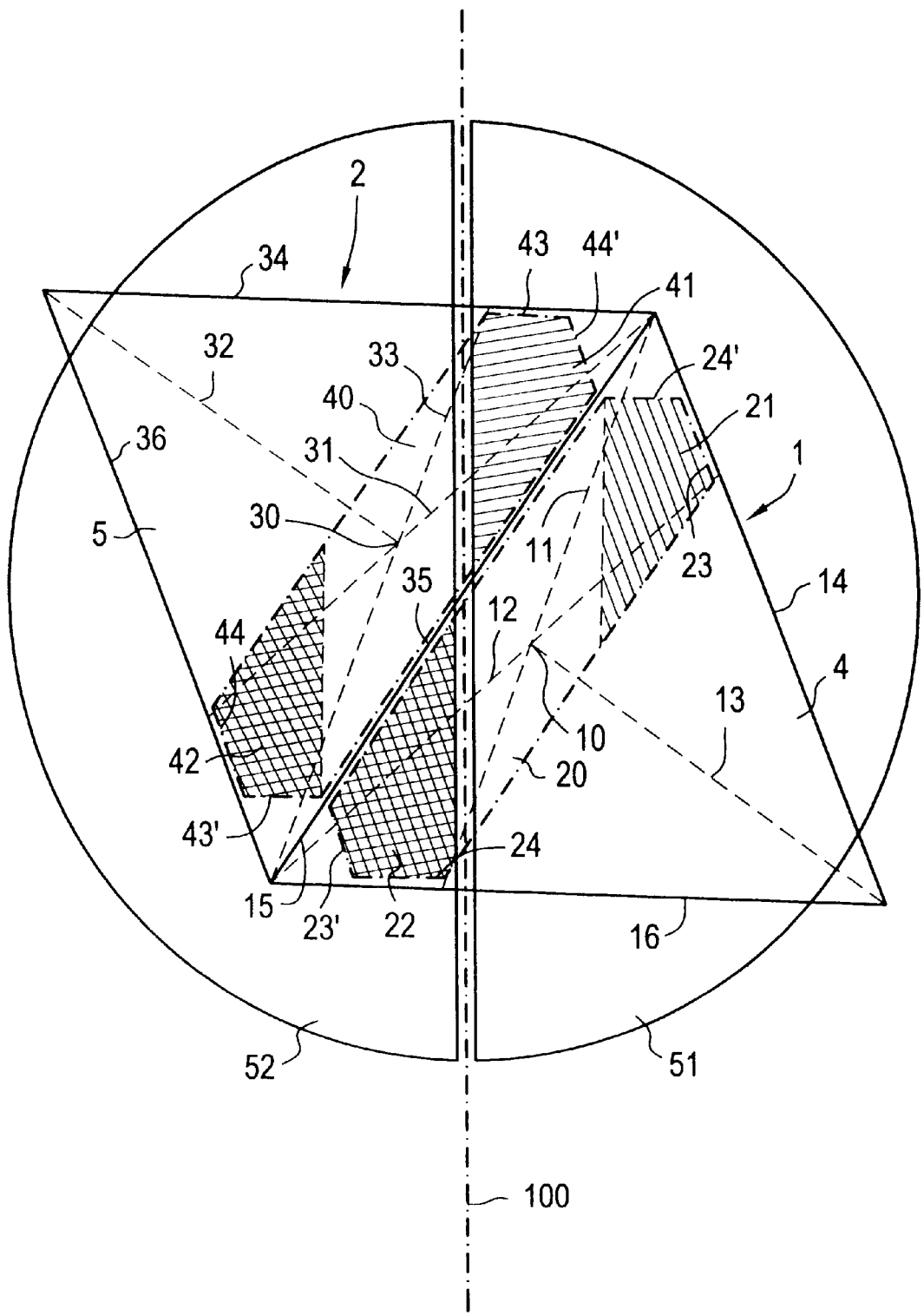
FIG. 3 shows a diagrammatic representation of the pupils of the triple prism arrangement in accordance with FIG. 1b, with retroreflecting useful surfaces in the case of half-side illumination for range finding.

In order to determine the three-dimensional co-ordinates of the prism arrangement, the distance of the prism arrangement from the surveying instrument is determined in addition to the angular co-ordinates by the known polar method, for example. A conventional optical range finder is used for this purpose. In said range finder, the ray bundles from the transmitter and receiver are formed with a semicircular bundle cross section and arranged separately next to one another. Consequently, the light of the transmitter, which is mostly in the infrared wavelength range, impinges in the shape of a semicircle on the triple prisms 1 and 2. The semicircular illumination surface 51 and its position with reference to the axis 100 is represented in FIG. 3. The neighboring semicircular surface 52, by contrast, specifies the receiving range of the range finder. Because of the separate transmitting and receiving ranges, and because of the point reflection of the incident light at the virtual prism vertices 10 and 30, only the light which is incident through the singly hatched useful surface 21 or 41 and emerges through the doubly hatched surface 22 or 42 is detected by the receiver of the range finder.

Because of the triple prism arrangement according to the invention with reference to this geometry of illumination and reception of the range finder, the intensity of possible multiple reflections between the range finder and triple prism arrangement is drastically reduced by comparison with the intensity of the useful signal, and plays no further role. As a result, erroneous measurements when measuring distance are excluded. The influence of multiple reflections is also negligible for small distances. In addition, there is only a slight difference between the length of the light paths of the rays reflected from the triple prisms 1 and 2, and this likewise contributes to a reliable and precise determinations of distance for short distance ranges.

Figure 4:
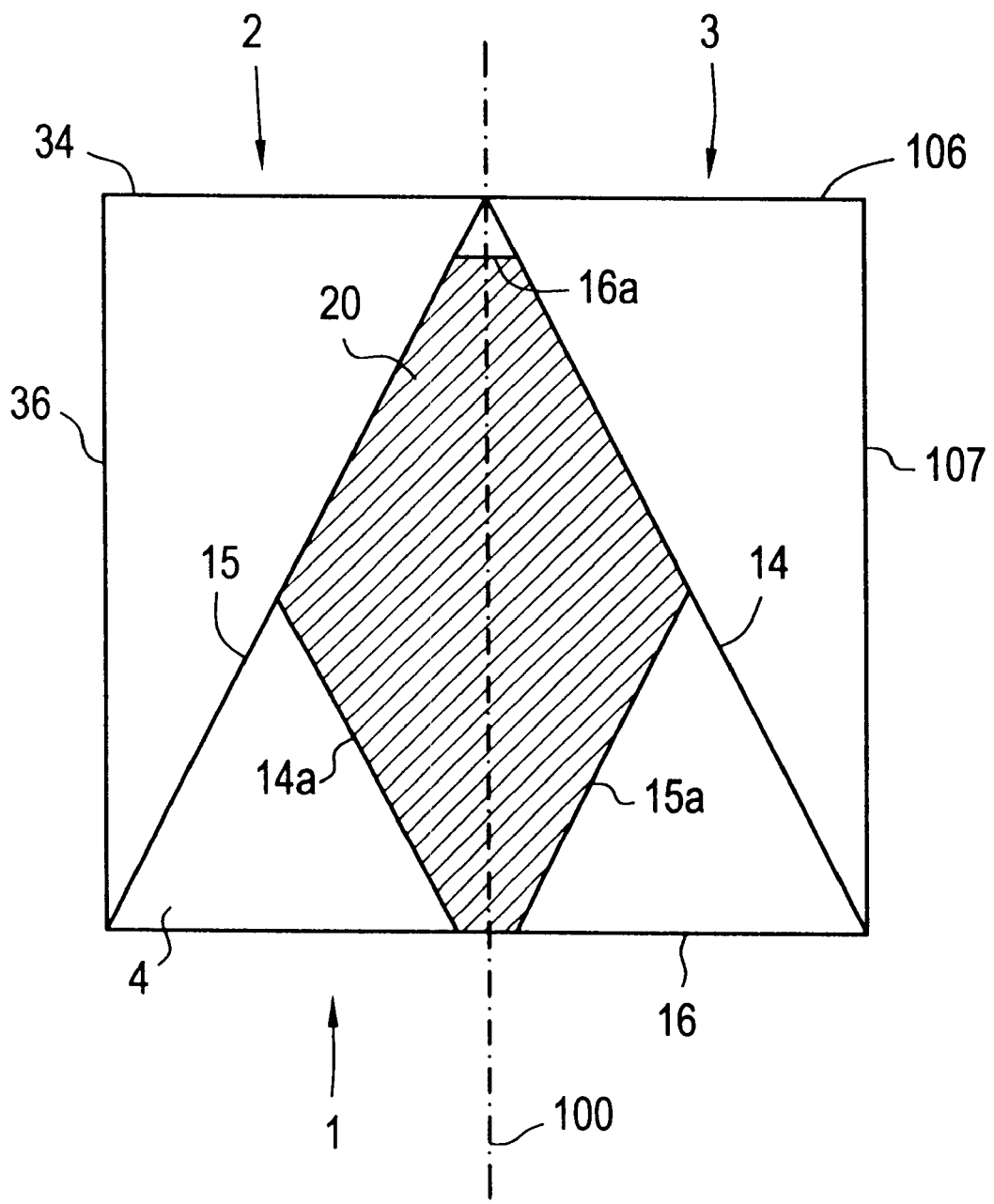
FIG. 4 shows a diagrammatic representation of three neighboring triple prisms and the pupil of the middle prism, rotated by 30° about the plumb rod axis by comparison with FIGS. 1–3.

If the triple prisms 1 and 2 of FIG. 3 are rotated by 30° about the axis 100, a view in accordance with FIG. 4 results. In this representation, the edges 14 and 15 of the triple prism 1 extend in space into the background from their intersection point. The edges 34 and 36 of the triple prism 2 and the edges, 106 and 107 of a further triple prism 3 are situated with their intersection points likewise in the background in space. The pupil surface 20, represented hatched, of the triple prism 1 is bounded by parts of the prism edges 14,15,16 and their point reflections 14a,15a,16a. The entire pupil surface 20 retroreflects in a useful fashion in this case. The light entering the right-hand hatched half of the surface re-emerges through the left-hand hatched half of the surface, and vice versa. The highest measuring accuracy is achieved for all three space co-ordinates in the case of such an alignment of the light entry surface 4 of the triple prism 1 in accordance with FIG. 4. The triple prisms 2 and 3 do not supply retroreflected light here.

The representations shown in FIG. 3 and FIG. 4 merge continuously into one another by rotating the prism arrangement about the axis 100. The useful retroreflecting surfaces 20,40 or 21,41 change in shape and size. It is decisive that in this case the neighboring pupil surfaces 20,40 always touch one another and always form a large useful retroreflecting surface. Since these go as far as into the corners of the triangles of the light entry surfaces 4,5 in the case of specific angles, it is important that the corners of the light entry surfaces 4,5 are present as completely as possible.

Figure 5:
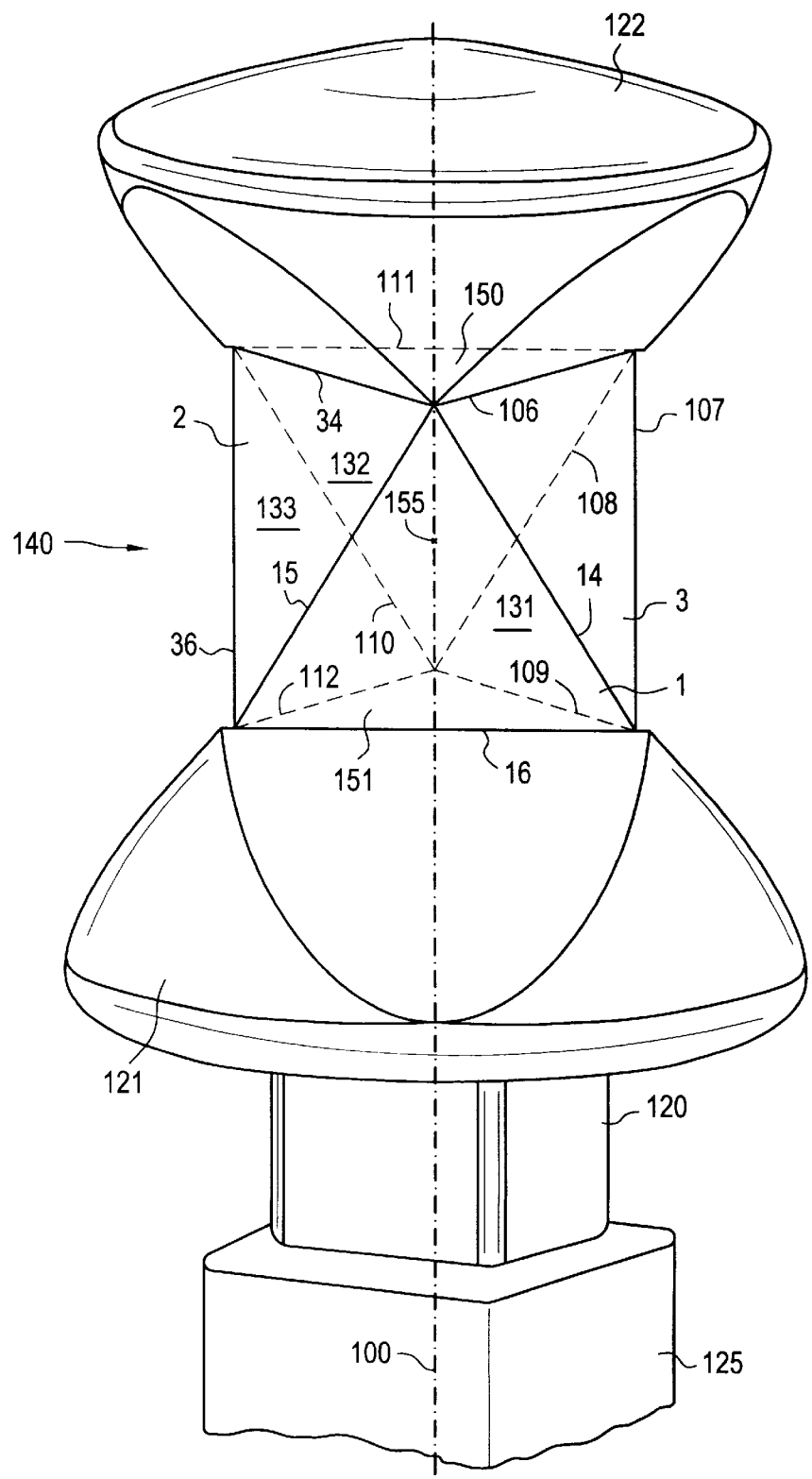
FIG. 5 shows a three-dimensional representation of an all-round reflector with six triple prisms, holders and plumb rod.

If three further triple prisms 131,132,133 are added to the rearside of the prism arrangement represented in FIG. 4, all the sides are filled up all round by triple prisms without a gap. All the triple prisms occupy octahedral places, and all the real prism vertices touch one another at the center point of the octahedron 155 (FIG. 5). In principle, the opposite octahedral places 150,151 on the axis 100 can likewise be provided with triple prisms. However, it is also possible for mounts 121,122 to be attached at these octahedral places.

A spatial representation of this prism arrangement, serving as an all-round reflector 140, with six triple prisms 1,2,3,131,132,133 is shown in FIG. 5. The light entry surfaces of the six triple prisms 1,2,3,131, 132,133 form an equilateral triangle in each case. The triangle sides of the triple prisms 1,2 and 3, which are located in the foreground and marked by continuous lines, have already been named. The light entry surfaces of the three triple prisms 131,132, 133 which are located in the background and marked by dashes are determined by the following triangle sides: 107,108,109 or 108,110,111 or 110,112,36.

The prism arrangement is protected and supported by the mounts 121 and 122. An adaptor 120 is attached to the mount 121. Holding devices 125 can be coupled to the adaptor 120. Such holding devices 125 can be a stand or a plumb rod, for example. In the normal case, the plumb rod axis will coincide here with the axis 100 of the triple prism arrangement. The axis 100 goes through the center point of the octahedron 155. The light directed by a surveying instrument onto the all-round reflector 140 is reflected at high intensity over the entire range of rotation when the plumb rod is rotated about the plumb rod axis. In this case, a high measuring accuracy of the 3-dimensional co-ordinates of the all-round reflector 140 is achieved for each angle of rotation. For particularly accurate co-ordinate measurements, one of the triple prisms 1,2,3,131,132,133 of the all-round reflector 140 can be aligned exactly with the surveying instrument (in accordance with FIG. 4).

If required, it is likewise possible to attach to the mount 122 an adaptor 120 to which further components can be attached for surveying.

In building surveying or in geodetic surveying, the all-round reflector 140 can be sighted simultaneously by a plurality of surveying instruments. Aligning the all-round reflector 140 can be eliminated. It can therefore advantageously be used as reference aiming marker. As already discussed, reliable distance measurements are achieved here even in the case of short distances.

The all-round reflector 140 is also attended by particular advantages in the case of automatic surveying. Only one person suffices to operate the surveying instrument and all-round reflector 140. Once set to the all-round reflector 140, the surveying instrument automatically follows the all-round reflector 140 in any position, independently of any possible rotations or tilting of the all-round reflector 140. There is no longer any need to pay heed to the alignment of said reflector with the surveying instrument. The carrier of the plumb rod with an all-round reflector 140 can therefore devote his full attention to the terrain to be surveyed.

I claim:

1. Arrangement for retroreflection of an optical ray using triple prisms, characterized in that 6 to 10 triple prisms (1,2) are provided and arranged in such a way that the side faces (7,8,9) of respectively adjacent triple prisms (1,2) bear directly against one another and the triple prism vertices (6) are situated as close to one another as possible in space, the light entry surface (4,5) of each triple prism (1,2) being constructed in a triangular shape, and the light entry surfaces (4,5) of adjacent triple prisms (1,2) being tilted relative to one another, and the lines of contact (15a;35a) of the pupils (20;40) of adjacent triple prisms (1,2) extending in a skew fashion relative to a vertical axis (100) leading through the center of the arrangement.

2. Arrangement according to claim 1, characterized in that triple prisms (1,2) of identical size are provided.

3. Arrangement according to claim 1, characterized in that rotationally symmetrical triple prisms (1,2) are provided in which the light entry surface (4,5) forms an equilateral triangle.

4. Arrangement according to claim 1, characterized in that six triple prisms (1,2,3, 131,132,133) are assembled to form an all-round reflector (140) in which the respectively succeeding triple prisms (1,2,3,131,132,133) are rotated by 180° with respect to one another and are adapted to one another in such a way that their triple prism vertices (6) meet at a common point (155).

5. Arrangement according to claim 4, characterized in that a mount (121) with an adaptor (120) is provided for the all-round reflector (140), and in that a holding device (125) can be coupled to the adaptor (120).

6. The arrangement of claim 1, wherein each of the light entry surfaces is rounded off at each of its corners.

7. The arrangement of claim 1, wherein six triple prisms are disposed such that they occupy six of eight possible octahedal positions, with the light entry surfaces of each of the triple prisms facing outward away from the center of the octahedron, and wherein two remaining octahedral positions are opposite one another and are occupied by mounts.

8. The arrangement of claim 1, wherein the triple prisms are further arranged such that an optical can be retroreflected for an angular range of 360 degrees.

9. An apparatus for retroreflection of an optical ray using triple prisms, the apparatus comprising:

six triple prisms, each of which includes a vertex, a light entry surface, and three side faces, wherein the six triple prisms are arranged with the side faces of respectively adjacent triple prisms bearing directly against one another and the triple prism vertices are situated as close to one another as possible in space such that the light entry surface of each triple prism is positioned for exposure to incident light and wherein lines of contact of pupils of adjacent triple prisms extend in a skew fashion relative to a vertical axis leading through the center of the apparatus.

10. The apparatus of claim 9, wherein each of the light entry surfaces is constructed in a triangular shape, and the light entry surfaces of adjacent triple prisms are tilted relative to one another.

11. The apparatus of claim 10, wherein each of said light entry surfaces is rounded off at each of its corner.

12. The apparatus of claim 9, wherein each of the triple prisms has substantially the same size.

13. The apparatus of claim 9, wherein each of the triple prisms is rotationally symmetric so that each of the light entry surfaces forms an equilateral triangle.

14. The apparatus of claim 9, wherein the six triple prisms are assembled to form an all-round reflector in which the respectively succeeding triple prisms are rotated by 180° with respect to one another and are adapted to one another in such a way that the triple prism vertices meet at a common point.

15. The apparatus of claim 14, further comprising a mount with an adaptor for the all-round reflector, wherein the adaptor is for coupling to a holding device.

16. The apparatus of claim 9, wherein the six triple prisms are disposed such that they occupy six of eight possible octahedral positions, with the light entry surfaces of each of the triple prisms facing outward away from the center of the octahedron, and wherein two remaining octahedral positions are opposite one another and are occupied by mounts.

17. The apparatus of claim 16, wherein the six triple prisms are each rotationally symmetric and of the same size, each light entry surface is rounded off at each of its corners, all of the triple prism vertices meet at a centerpoint of the octahedron, and one of the mounts is connected to an adapter which is connected to a plumb rod.

18. The apparatus of claim 9, further comprising an additional four triple prisms, each of which includes a vertex, a light entry surface, and three side faces, wherein the ten triple prisms are arranged with the side faces of respectively adjacent triple prisms bearing directly against one another such that the light entry surface of each triple prism is positioned for exposure to incident light.

19. An apparatus for retroreflection of an optical ray using triple prisms, the apparatus comprising:

six triple prisms, each of which includes a vertex, a light entry surface, and three side faces, wherein the six triple prisms are arranged such that upon transition of a retroreflection from a selected triple prism to a neighboring triple prism, pupils of the selected triple prism and the neighboring triple prism touch.

20. The apparatus of claim 19, wherein the triple prism are further arranged such that an optical ray can be retroreflected for an angular range of 360 degrees.

21. The apparatus of claim 20, wherein the six triple prisms are each rotationally symmetric and of the same size, each light entry surface is rounded off at each of its corners, and all of the triple prism vertices meet a centerpoint of an octahedron.

* * * * *